(12) United States Patent  
Martin et al.

(10) Patent No.: US 8,948,239 B1
(45) Date of Patent: Feb. 3, 2015

(54) METHODS AND APPARATUS FOR MULTI-POLARIZATION ANTENNA SYSTEMS

(71) Applicant: Juniper Networks, Inc., Sunnyvale, CA (US)

(72) Inventors: John R. Martin, Danville, CA (US); Jeffrey L. Pochop, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/954,349

(22) Filed: Jul. 30, 2013

(51) Int. Cl.
*H04B 17/00* (2006.01)
*H04B 7/04* (2006.01)

(52) U.S. Cl.
CPC .................................. *H04B 7/0413* (2013.01)
USPC ...................................................... 375/224

(58) Field of Classification Search
CPC ............... H04L 1/20; H04L 1/24; H04B 3/46
USPC .................. 375/224, 267; 343/840, 848, 893; 455/41.2, 78, 90.2
See application file for complete search history.

(56) References Cited

U.S. PATENT DOCUMENTS

2007/0096991 A1* 5/2007 Lastinger et al. ...... 343/700 MS
2009/0073063 A1* 3/2009 Liu et al. ........................ 343/703

* cited by examiner

*Primary Examiner* — Khai Tran
(74) *Attorney, Agent, or Firm* — Cooley LLP (57) ABSTRACT

An apparatus includes a phase delay module that is configured to receive a set of signals from an antenna assembly having a horizontal polarization element and an elliptical polarization element. The horizontal polarization element and the elliptical polarization element are collectively configured to receive the set of signals over a coverage area. The phase delay module is configured to determine (1) a signal strength of a first signal from the set of signals received via the horizontal polarization element and (2) a signal strength of a second signal from the set of signals received via the elliptical polarization element. The phase delay module is configured to send a combined signal including (1) the first signal and (2) the second signal having a phase delay if the signal strength of the first signal is higher than the signal strength of the second signal.

20 Claims, 4 Drawing Sheets

METHODS AND APPARATUS FOR MULTI-POLARIZATION ANTENNA SYSTEMS

BACKGROUND

Embodiments described herein relate generally to multiple-input-multiple-output (MIMO) data transmission and more particularly, to apparatus and methods of use for an antenna system with multi-polarization.

In some instances, the performance of a radio and/or the performance of a wireless link using a multi-stream Institute of Electrical and Electronics Engineers (IEEE) 802.11(a/b/g/n/ac) MIMO protocol can be dependent on the ability of the radio to isolate and differentiate between multiple data streams. As such, one or more antenna techniques can be implemented to enhance the antenna diversity (i.e., to isolate and differentiate multiple data streams). Such antenna techniques can include, for example, spatial diversity, pattern diversity, polarity diversity, and/or the like. Specifically, spatial diversity employs multiple antennas, generally with the same characteristic, that are physically separated from one another by a distance on the order of the signal wavelength to multiple miles. Pattern diversity employs multiple directive antennas that are co-located (e.g., within a relatively short distance of about the signal wavelength or less) with different radiation patterns to provide a higher gain versus a single omnidirectional antenna. Polarity diversity typically combines pairs of cross-polarized antennas (i.e., antennas with orthogonal polarizations, such as horizontal and vertical, +slant 45° and −slant 45°, etc.) to immunize a system from polarization mismatches that would potentially otherwise cause signal fade.

Often, in buildings (e.g., homes, offices, etc.) when no clear line-of-sight (LOS) exists between a transmitter and a receiver, a signal can be reflected along multiple paths before finally being received. In such scenarios, multiple antennas at the receiver can provide several observations of the same signal that are received via the multiple paths. In some instances, each antenna can experience a different interference environment along the corresponding path. Thus, if one antenna is experiencing a deep fade, another antenna likely has a sufficient signal. Collectively, such a system can provide a robust wireless link. Similarly, multiple antennas can be proven valuable for transmitting systems as well as the receiving systems. As a result, antenna diversity at the transmitter and/or the receiver can be effective at mitigating the multipath situations and providing an overall good performance for the wireless link.

In settings without high multipath ability, however, systems employing MIMO often exhibit reduced signal performance. For example, in large campus settings and/or the like with limited surfaces to reflect the signal (e.g., in instances of LOS transmission, and/or the like), signal diversity can be limited due, at least in part, to the LOS component of the signal overwhelming the multipath components of the signal. In this manner, a larger importance can be placed on polarization diversity to achieve the desired signal diversity. Radios, however, often include orthogonal antennas having only two polarizations (e.g., horizontal and vertical), which can still result in limited signal diversity.

Thus, a need exists for methods and apparatus for multi-polarization antenna systems.

SUMMARY

In some embodiments, an apparatus includes a phase delay module that is configured to receive a set of signals from an antenna assembly having a horizontal polarization element and an elliptical polarization element. The horizontal polarization element and the elliptical polarization element are collectively configured to receive the set of signals over a coverage area. The phase delay module is configured to determine (1) a signal strength of a first signal from the set of signals received via the horizontal polarization element and (2) a signal strength of a second signal from the set of signals received via the elliptical polarization element. The phase delay module is configured to send a combined signal including (1) the first signal and (2) the second signal having a phase delay if the signal strength of the first signal is higher than the signal strength of the second signal.

DETAILED DESCRIPTION

Apparatus and methods of use for an antenna system with multi-polarization are described herein. In some embodiments, an apparatus includes a phase delay module that is configured to receive a set of signals from an antenna assembly having a horizontal polarization element and an elliptical polarization element. The horizontal polarization element and the elliptical polarization element are collectively configured to receive the set of signals over a coverage area. The phase delay module is configured to determine (1) a signal strength of a first signal from the set of signals received via the horizontal polarization element and (2) a signal strength of a second signal from the set of signals received via the elliptical polarization element. The phase delay module is configured to send a combined signal including (1) the first signal and (2) the second signal having a phase delay if the signal strength of the first signal is higher than the signal strength of the second signal.

In some embodiments, a method includes receiving a first signal associated with a data stream received from a device via a vertical polarized antenna element. A second signal associated with the data stream is received from the device via an elliptical polarized antenna element. The method includes sending, at a time and based on a signal strength of the first signal being higher than a signal strength of the second signal, a first combined signal that includes (1) the first signal and (2) the second signal including a phase delay.

In some embodiments, an antenna assembly is configured to receive a set of signals from a device. The antenna assembly includes a horizontal polarization element, a vertical polarization element, and an elliptical polarization element. The antenna assembly is operably coupled to a phase delay module. The antenna assembly is configured to receive (1) a first signal from the set of signals via the horizontal polarization element, (2) a second signal from the set of signals via the vertical polarization element, and (3) a third signal from the set of signals via the elliptical polarization element. The antenna assembly is configured to pass the first signal, the second signal, and the third signal to the phase delay module such that the phase delay module sends, when the signal strength of the first signal is greater than a signal strength of the second signal and a signal strength of the third signal, a combined signal that includes (1) the first signal, (2) the second signal that has a first phase delay, and (3) the third signal that has a second phase delay.

As used in this specification, the terms "polarized" and "polarization" relate to an orientation of a propagating wave such as a radio transmission, laser transmission, and/or any other electromagnetic wave transmission. In this manner, the polarization of a wave is described by specifying the orientation of its electric field at a point in space. In some instances, an electric field of an electromagnetic wave can be orientated in a single direction (e.g., a linear polarization) resulting in commonly known horizontal polarization (H-polarization or H-pole) and vertical polarization (V-polarization or V-pole). In other instances, an electric field of an electromagnetic wave can rotate resulting in commonly known circular polarization or elliptical polarization. As such, the size and/or shape of the electric field of the electromagnetic wave can be based, at least partially, on the size and/or shape, respectively, of a transmission element. For example, an elongated transmission element can transmit a propagating electromagnetic wave that is associated with an elliptical (e.g., elongated polarization).

As used herein, the terms "perpendicular," "orthogonal," and "normal" can be used interchangeably and generally describe a relationship between two geometric constructions (e.g., two lines, two planes, a line and a plane, or the like) in which the two geometric constructions are disposed at substantially 90°. For example, a line is said to be perpendicular to another line when the lines intersect at an angle substantially equal to 90°. Similarly, when a planar surface (e.g., a two dimensional surface) is said to be orthogonal to another planar surface, the planar surfaces are disposed at substantially 90° as the planar surfaces extend to infinity. By way of example, the polarization of a first electromagnetic wave can be described as being "normal" to the polarization of a second electromagnetic wave when an electric field of the first electromagnetic wave and an electric field of the second electromagnetic wave are disposed at substantially 90°.

As used herein, the singular forms "a," "an" and "the" include plural referents unless the context clearly dictates otherwise. Thus, for example, the term "an element" is intended to mean a single element or a combination of elements, "a material" is intended to mean one material or multiple materials.

Figure 1:
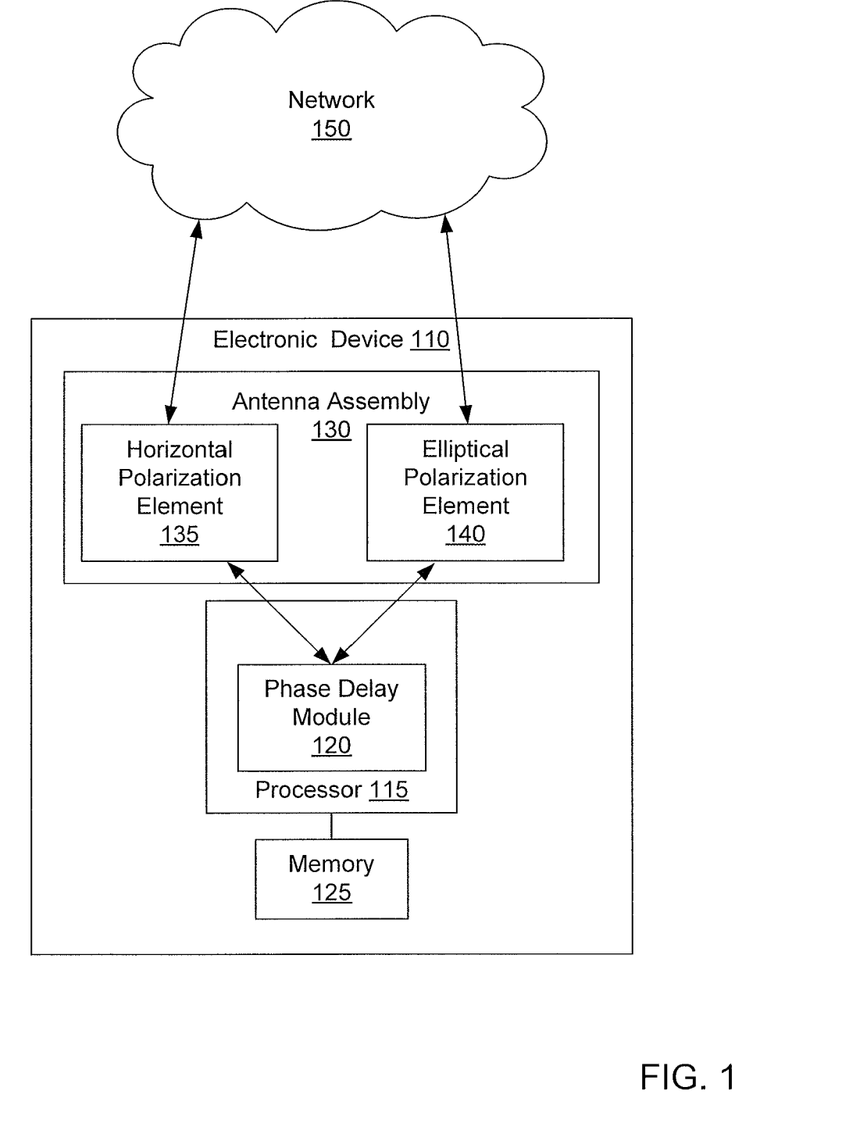
FIG. 1 is a schematic illustration of an electronic device operatively coupled to a network, according to an embodiment.

FIG. 1 is a schematic illustration of an electronic device 110 operatively coupled to a network 150, according to an embodiment. The electronic device 110 can be, for example, a personal computer (PC), a personal digital assistant (PDA), a smart phone, a laptop, a tablet PC, a video game console, a server device (e.g., a web server device), a network management device, and/or the like. The network 150 (also referred to herein as "coverage area") can be any type of network (e.g., a local area network (LAN), a wide area network (WAN), a worldwide interoperability for microwave access network (WiMAX), a virtual network, a cellular network, and/or the internet) implemented, at least in part, as a wireless network.

The electronic device 110 includes at least a processor 115, a memory 125, and an antenna assembly 130. The memory 125 can be, for example, a random access memory (RAM), a memory buffer, a hard drive, a read-only memory (ROM), an erasable programmable read-only memory (EPROM), and/or the like. In some embodiments, the memory 125 of the electronic device 110 stores instructions to cause the processor 115 to execute modules, processes, and/or functions associated sending and/or receiving one or more signals over the network 150, as described in further detail herein.

The processor 115 of the electronic device 110 can be any suitable processing device configured to run or execute a set of instructions or code. For example, the processor 115 can be a general purpose processor (GPU), a central processing unit (CPU), an accelerated processing unit (APU), a network processor, a front end processor, and/or the like. The processor 115 can be configured to run or execute a set of instructions or code stored in the memory 125 associated with using a PC application, a mobile application, an internet web browser, a cellular communication, a wireless transmission, a routing operation, a switching operation, and/or the like. In some embodiments, the processor 115 can run or execute a set of instructions to cause the antenna assembly 130 to send a signal to and/or receive a signal from the network 150, as further described herein. In some embodiments, the processor 115 can include and/or be operably coupled to any other suitable component, controller, or processing unit. For example, in some embodiments, the processor 115 can include a transceiver, a physical controller (PHY controller), a medium access controller (MAC), and a CPU.

The antenna assembly 130 can be included in any suitable communication device (not shown in FIG. 1), component, and/or module that is included within the electronic device 110 and is configured to communicate with the network 150. For example, the antenna assembly 130 can be included in one or more network interface devices (e.g., a network interface card). As described in further detail herein, the antenna assembly 130 can be configured to transmit data using, for example, a MIMO protocol. For example, as shown in FIG. 1, the antenna assembly 130 includes a horizontal polarization element 135 and an elliptical polarization element 140. As such, the antenna assembly 130 can be configured to transmit and receive data using at least two polarized data streams. In other embodiments, the antenna assembly 130 can be configured to transmit and receive data using more than two polarized data streams, as described in further detail herein. In this manner, the antenna assembly 130 can be configured to wirelessly communicate (e.g., by sending and/or receiving electromagnetic signals) with the network 150 and/or any suitable device connected thereto (e.g., a wireless access point, one or more other electronic devices, etc.).

The horizontal polarization element 135 and the elliptical polarization element 140 can be any suitable element. The horizontal polarization element 135 can have, for example, a linear polarization. The elliptical polarization element 140 can have an elliptical or circular polarization that can be arranged in a clockwise or counter clockwise orientation. In some embodiments, the horizontal polarization element 135 can be an omnidirectional element that operates in the 2.4 GHz band (e.g., 802.11 b/g/n) and/or the 5 GHz band (e.g., 802/11 a/n/ac). Similarly, the elliptical polarization element 140 can be an omnidirectional element that operates in the 2.4 GHz band and/or the 5 GHz band. Moreover, the horizontal polarization element 135 and the elliptical polarization element 140 can be formed from any suitable ferrite or internal antenna cables, and/or the like.

As described above, the processor 115 can include and/or can be configured to execute any suitable module. A module can be, for example, any assembly and/or set of operatively-coupled electrical components, and can include, for example, a memory, a processor, electrical traces, optical connectors, software (executing in hardware), and/or the like. For example, a module executed in the processor 115 can be any combination of hardware-based module (e.g., a field-programmable gate array (FPGA), an application specific integrated circuit (ASIC), a digital signal processor (DSP)) and/or software-based module (e.g., a module of computer code stored in memory 125 and/or executed at the processor 115) capable of performing one or more specific functions associated with that module.

As shown in FIG. 1, the processor 115 can include a phase delay module 120. The phase delay module 120 can be configured to send to and/or receive from the antenna assembly 130, one or more electrical signals that are based at least in part on a set of electromagnetic signals received by the antenna assembly 130. Furthermore, based at least in part on the signal strength of each electrical signal, the phase delay module 120 can also be configured to delay and/or otherwise alter the phase of at least one of the electrical signals included in a set of electrical signals. For example, in some instances, the electronic device 110 can send and/or receive a set of electromagnetic signals to and/or from any suitable electronic device (not shown in FIG. 1) included in the network 150. In some instances, the set of electromagnetic signals can be sent and/or received using a MIMO protocol with, for example, polarization diversity. As such, the antenna assembly 130 can send and/or receive the electromagnetic signals. More particularly, the horizontal polarization element 135 can send and/or receive one or more electromagnetic signals having a horizontal polarization and the elliptical polarization element 140 can send and/or receive one or more electromagnetic signals having an elliptical polarization.

In some instances, upon receiving a set of electromagnetic signals over the network 150, the antenna assembly 130 can be configured to send a set of electrical signals associated with the electromagnetic signals to the phase delay module 120 (e.g., a hardware module or a software module stored in the memory 125 and/or executed at the processor 115) of the processor 115. For example, the horizontal polarization element 135 can receive an electromagnetic signal having a horizontal polarization and the elliptical polarization element 140 can receive an electromagnetic signal having an elliptical polarization. As a result, the antenna assembly 130 can send a first electrical signal associated with the first electromagnetic signal having the horizontal polarization and a second electrical signal associated with the electromagnetic signal having the elliptical polarization to the phase delay module 120. The phase delay module 120 can, in turn, determine the signal strength of the first electrical signal and the signal strength of the second electrical signal.

In some instances, the first electrical signal and the second electrical signal can have substantially similar signal strengths. In such instances, the phase delay module 120 can be configured to combine the first electrical signal and the second electrical signal to define and/or form a combined electrical signal. For example, in some instances, at least a portion of the electromagnetic signal having the horizontal polarization and at least a portion of the electromagnetic signal having the elliptical polarization can include similar data. In such instances, the phase delay module 120 can combine at least a portion of the electrical signals associated with the received electromagnetic signals using, for example, maximum ratio combining (MRC) or the like to increase signal strength, gain, attenuation, signal-noise-ratio, and or the like.

In some instances, the phase delay module 120 can send the combined electrical signal and/or an electrical signal representing the combined electrical signals to any other suitable component and/or module (not shown in FIG. 1) for further processing. For example, in some instances, the phase delay module 120 can receive a set of electrical signals from the antenna assembly 130 and can combine the electrical signals to define a combined electrical signal (as described above). In such instances, the phase delay module 120 can send and/or forward the combined electrical signal (and/or an electrical signal representing the combined electrical signal) to, for example, a display module (not shown in FIG. 1) included in the processor 115, which, upon receipt, can process the combined electrical signal. In some instances, once the display module has processed the combined electrical signal, the display module can send a signal indicative of an instruction to graphically represent data associated with the combined electrical signal on a display (not shown in FIG. 1) of the electronic device 110. For example, the display can graphically represent a website, a video stream, a picture and/or the like that can be associated with the set of electromagnetic signals received by the antenna assembly 130. In other instances, the phase delay module 120 can send the combined signal to any other electronic component operably coupled to the processor 115 such as, for example, a different module included in the processor 115 (e.g., an application), a speaker, a haptic device, etc.

In some instances, the phase delay module 120 can send and/or forward the combined electrical signal (and/or a signal representing the combined electrical signal) to a processing module (not shown in FIG. 1) included in the processor 115, which can be configured to process the combined electrical signal to define and/or form a processed electrical signal. In some instances, the processing module can send the processed electrical signal (and/or an electrical signal representing the processed electrical signal) to the antenna assembly 130. In such instances, upon receipt of the processed electrical signal, the antenna assembly 130 can send the processed electrical signal and/or an electrical signal representing at least a portion of the processed electrical signal to the horizontal polarization element 135 and can send the processed electrical signal and/or an electrical signal representing at least a portion of the processed electrical signal to the elliptical polarization element 140. As a result, the horizontal polarization element 135 can send, to any suitable electronic device (not shown in FIG. 1) via the network 150, an electromagnetic signal that is associated with the processed signal and that has the horizontal polarization. Similarly, the elliptical polarization element 140 can send, to the suitable electronic device via the network 150, an electromagnetic signal that is associated with the processed electrical signal and that has an elliptical polarization.

Although the phase delay module 120 is described above as receiving electrical signals with substantially equal signal strengths, in some instances, the phase delay module 120 can receive electronic signals from the antenna assembly 130 having different signal strengths. For example, in some instances, the phase delay module 120 can receive, from the antenna assembly 130, a first electrical signal associated with an electromagnetic signal having the horizontal polarization and a second electrical signal associated with an electromagnetic signal having the elliptical polarization. In some instances, the phase delay module 120 can determine that the strength of the first electrical signal is higher than the strength of the second electrical signal. As such, the phase delay module 120 can delay and/or otherwise modify the second electrical signal to an extent that is based on the first electrical signal. In this manner, the phase delay module 120 can combine the first electrical signal and the phase-delayed second electrical signal to produce a combined electrical signal having, for example, a greater strength, a greater signal-to-noise ratio, a greater gain, a greater attenuation, and/or the like.

After forming the combined electrical signal, the phase delay module 120 can send the combined electrical signal and/or a signal representing the combined electrical signal to any suitable component included in the electronic device 110, as described above.

Although the phase delay module 120 is described above as receiving electrical signals and, upon receipt, combining the electrical signals to define a combined signal having greater strength, signal-to-noise ratio, gain, attenuation, and/or the like, in other embodiments, the phase delay module 120 need not combine the electrical signals to improve signal quality (e.g., strength, integrity, etc.). For example, in some instances, the horizontal polarization element 135 can receive a first electromagnetic signal having the horizontal polarization and the elliptical polarization element 140 can receive a second electromagnetic signal having the elliptical polarization. In some instances, the first electromagnetic signal can be associated with, for example, a first data stream and the second electromagnetic signal can be associated with, for example, a second data stream, different from the first data stream. In such instances, the arrangement of the horizontal polarization element 135 and the elliptical polarization element 140 can increase and/or otherwise optimize spatial diversity, which can allow for an increase in throughput or the like. Moreover, the increase and/or optimization of the spatial diversity through the use of the three polarizations (e.g., horizontal, elliptical, and vertical) can be such that the antenna assembly 130 can differentiate the data streams more effectively than otherwise possible using, for example, a single polarization. Thus, the phase delay module 120 and/or any other suitable portion of the processor 115 can receive a first electrical signal associated with the first electromagnetic signal and a second electrical signal associated with the second electromagnetic signal and, upon receipt, can process the electrical signals as described above.

Figure 2:
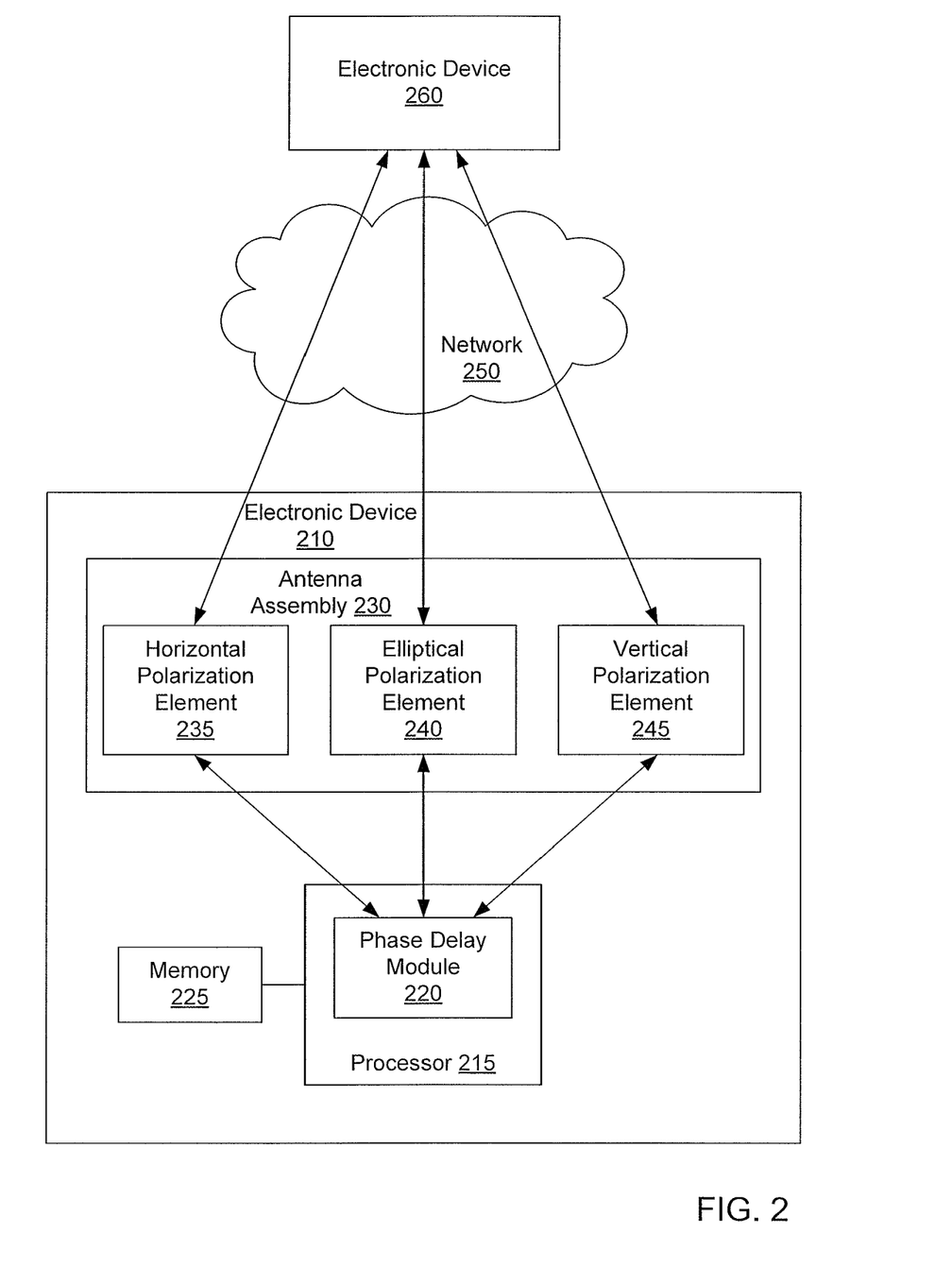
FIG. 2 is a schematic illustration of an electronic device operatively coupled to a network, according to another embodiment.

Although the antenna assembly 130 of the electronic device 110 is shown in FIG. 1 as including a single horizontal polarization element 135 and a single elliptical polarization element 140, in other embodiments, an antenna assembly can include multiple horizontal polarization elements and/or multiple elliptical polarization elements. Furthermore, in some embodiments, an antenna assembly can include a polarization element associated with another polarization. For example, FIG. 2 illustrates an electronic device 210 operatively coupled to a network 250, according to another embodiment.

The electronic device 210 includes at least a processor 215, a memory 225, and an antenna assembly 230. The electronic device 210 can be, for example, a personal computer (PC), a personal digital assistant (PDA), a smart phone, a laptop, a tablet PC, a video game console, a server device (e.g., a web server device), a network management device, and/or the like. The network 250 (also referred to herein as "coverage area") can be any type of network (e.g., a local area network (LAN), a wide area network (WAN), a worldwide interoperability for microwave access network (WiMAX), a virtual network, a cellular network, and/or the internet) implemented, at least in part, as a wireless network. As shown in FIG. 2, a second electronic device 260 can be operatively coupled to the network 250. In some embodiments, the second electronic device 260 can be substantially similar to or the same as the electronic device 210. Thus, the second electronic device 260 is not described in further detail herein.

The electronic device 210 includes at least a processor 215, a memory 225, and an antenna assembly 230. The memory 225 can be, for example, a random access memory (RAM), a memory buffer, a hard drive, a read-only memory (ROM), an erasable programmable read-only memory (EPROM), and/or the like. In some embodiments, the memory 225 of the electronic device 210 stores instructions to cause the processor 215 to execute modules, processes, and/or functions associated sending and/or receiving one or more signals over the network 250, as described in further detail herein.

The processor 215 of the electronic device 210 can be any suitable processing device configured to run or execute a set of instructions or code. For example, the processor can be a general purpose processor (GPU), a central processing unit (CPU), an accelerated processing unit (APU), a network processor, a front end processor, and/or the like. The processor 215 can be configured to run or execute a set of instructions or code stored in the memory 225 associated with using a PC application, a mobile application, an internet web browser, a cellular communication, a wireless transmission, a routing operation, a switching operation, and/or the like. In some embodiments, the processor 215 can run or execute a set of instructions to cause the antenna assembly 230 to send a signal to and/or receive a signal from, for example, the second electronic device 260 via the network 250, as further described herein.

The antenna assembly 230 can be included in any suitable communication device (not shown in FIG. 2), component, and/or module that is included within the electronic device 210 and is configured to communicate with the network 250. For example, the antenna assembly 230 can be included in one or more network interface devices (e.g., a network interface card). As described in further detail herein, the antenna assembly 230 can be configured to transmit data using, for example, a MIMO protocol. For example, as shown in FIG. 2, the antenna assembly 230 includes a horizontal polarization element 235, an elliptical polarization element 240, and a vertical polarization element 245. As such, the antenna assembly 230 can be configured to transmit data using at least three polarized data streams. In other embodiments, the antenna assembly 230 can be configured to transmit data using more than three polarized data streams, as described in further detail herein. In this manner, the antenna assembly 230 can be configured to wirelessly communicate with, for example, the electronic device 260 (e.g., a wireless access point, one or more other electronic devices, etc.) via the network 250.

The horizontal polarization element 235, the elliptical polarization element 240, and the vertical polarization element 245 each can be any suitable element. The horizontal polarization element 235 can have, for example, a linear polarization. Similarly, the vertical polarization element 245 can have, for example, a linear polarization and can be arranged to be substantially orthogonal to the horizontal polarization element 235. The elliptical polarization element 240 can have an elliptical or circular polarization that can be arranged in a clockwise or counter clockwise orientation. As a result, the elliptical polarization element 240 can effectively couple to the electrical field of a received electromagnetic wave that rotates about an axis in a substantially corkscrew manner (e.g., an electric field vector extends in a substantially helical manner). In some embodiments, the horizontal polarization element 235 the elliptical polarization element 240, and/or the vertical polarization element 245 can each be an omnidirectional element that operates in the 2.4 GHz band (e.g., 802.11 b/g/n) and/or the 5 GHz band (e.g., 802/11 a/n/ac). Moreover, the horizontal polarization element 235, the elliptical polarization element 240, and the vertical polarization element 245 can be formed from any suitable ferrite, internal antenna cables, and/or the like.

As described above, the processor 215 can include and/or can be configured to execute any suitable module (e.g., a hardware module and/or a software module stored in the memory 225 and/or executed at the processor 215). For example, the processor 215 can include a phase delay module 220, as shown in FIG. 2. The phase delay module 220 can be configured to receive and/or send a set of signals (e.g., electrical signals) and, based at least in part on the signal strength of each signal, delay and/or otherwise alter the phase of at least one of the signals included in the set of electrical signals. For example, in some instances, the electronic device 210 can receive a set of electromagnetic signals from any suitable electronic device (e.g., the electronic device 260) included in or operatively coupled to the network 250. In some instances, the set of electromagnetic signals can be sent using a MIMO protocol with, for example, polarization diversity. As such, the antenna assembly 230 can receive the electromagnetic signals and, more particularly, the horizontal polarization element 235 can receive one or more electromagnetic signals or electromagnetic signal components having a horizontal polarization, the elliptical polarization element 240 can receive one or more electromagnetic signals or electromagnetic signal components having an elliptical polarization, and the vertical polarization element 245 can receive one or more electromagnetic signals or electromagnetic signal components having a vertical polarization.

In some instances, upon receiving the electromagnetic signals and/or the electromagnetic signal components, the antenna assembly 230 can send a set of electrical signals, associated with the electromagnetic signals to the phase delay module 220 of the processor 215. Expanding further, the antenna assembly 230 can receive the electromagnetic signals via a wireless data stream and, upon receiving the electromagnetic signals, can send the electrical signals (i.e., independent electrical signals that are based on a single electromagnetic signal) to the phase delay module 220 via an electric circuit included in the electronic device 210 (not shown in FIG. 2). In turn, the phase delay module 220 can determine a signal strength of, for example, a first electrical signal based on the electromagnetic signal associated with the horizontal polarization, a signal strength of a second electrical signal based on the electromagnetic signal associated with the elliptical polarization, and a signal strength of a third electrical signal based on the electromagnetic signal associated with the vertical polarization. In some instances, the electrical signals associated with the three polarizations can have substantially similar signal strengths. In such instances, the phase delay module 220 can be configured to combine the electrical signals to produce a combined electrical signal and, in turn, send the combined electrical signal and/or an electrical signal representing the combined electrical signal to any other suitable component and/or module (not shown in FIG. 2) for further processing.

For example, in some instances, the phase delay module 220 can receive a set of electrical signals from the antenna assembly 230 associated with an electromagnetic signal having a horizontal polarization, an electromagnetic signal having a vertical polarization, and an electromagnetic signal having an elliptical polarization. The phase delay module 220 can be configured to combine the electrical signals to define a combined electrical signal (as described above). In such instances, the phase delay module 220 can send and/or forward the combined electrical signal (and/or an electrical signal representing the combined electrical signal) to, for example, a display module (not shown in FIG. 2) included in the processor 215, which, upon receipt, can process the combined electrical signal. In some instances, once the display module has processed the combined electrical signal, the display module can send a signal indicative of an instruction to graphically represent data associated with the combined electrical signal on a display (not shown in FIG. 2) of the electronic device 210, as described above with reference to FIG. 1. In other instances, the phase delay module 220 can send the combined signal to any other electronic component operably coupled to the processor 215 such as, for example, a different module included in the processor 215 (e.g., an application), a speaker, a haptic device, etc.

As described above with reference to FIG. 1, in some instances, the phase delay module 220 can send and/or forward the combined electrical signal (and/or a signal representing the combined electrical signal) to a processing module and/or the like (not shown in FIG. 2). The processing module can be configured to process the combined electrical signal to define and/or form a processed electrical signal and to send the processed electrical signal (and/or an electrical signal representing the processed electrical signal) to the antenna assembly 230. In such instances, upon receipt of the processed electrical signal, the antenna assembly 230 can send the processed electrical signal and/or an electrical signal representing at least a portion of the processed electrical signal to the horizontal polarization element 235, the processed electrical signal and/or an electrical signal representing at least a portion of the processed electrical signal to the elliptical polarization element 240, and the processed electrical signal and/or an electrical signal representing at least a portion of the processed electrical signal to the vertical polarization element 245. As a result, the horizontal polarization element 235 can send, to the electronic device 260 via the network 250, an electromagnetic signal that is associated with the processed signal and that has the horizontal polarization. Similarly, the elliptical polarization element 240 can send, to the electronic device 260 via the network 250, an electromagnetic signal that is associated with the processed electrical signal and that has an elliptical polarization; and the vertical polarization element 245 can send, to electronic device 260 via the network 250, an electromagnetic signal that is associated with the processed electrical signal and that has a vertical polarization.

Although the phase delay module 220 is described above as receiving electrical signals with substantially equal signal strengths, in some instances, the phase delay module 220 can receive a first electrical signal based on the electromagnetic signal associated with the horizontal polarization, a second electrical signal based on the electromagnetic signal associated with the elliptical polarization, and a third electrical signal based on the electromagnetic signal associated with the vertical polarization that can each have different signal strengths. For example, the phase delay module 220 can determine that the signal strength of the first electrical signal is higher than the signal strength of the second electrical signal and that the signal strength of the second electrical signal is higher than the signal strength of the third electrical signal. As such, the phase delay module 220 can delay and/or otherwise modify the second electrical signal to a first extent that is at least partially based on the first electrical signal and can delay and/or otherwise modify the third electrical signal to a second extent that is also at least partially based on the first electrical signal. In this manner, the phase delay module 220 can combine the first electrical signal, a first phase-delayed electrical signal associated with the elliptical polarization, and a second phase-delayed electrical signal (with a second phase-delay that is different than the first phase-delay) associated with the vertical polarization to produce a combined signal having, for example, a strength, a signal-to-noise ratio, a gain, an attenuation, and/or the like greater than the electrical signals prior to combination.

After forming the combined electrical signal, the phase delay module 220 can send and/or forward the combined electrical signal (and/or an electrical signal representing the combined electrical signal) to any suitable component, module, device, and/or the like included in the electronic device 210. For example, in some instances, the phase delay module 220 can send and/or forward the combined electrical signal to a processing module and/or the like (not shown in FIG. 2), which can, in turn, process to the combined signal to define and/or form a processed electrical signal. In some instances, the processing module can send the processed electrical signal and/or an electrical signal representing at least a portion of the processed electrical signal to the antenna assembly 230. As described in detail above, the antenna assembly 230 can then be configured to send the processed electrical signal and/or an electrical signal representing at least a portion of the processed electrical signal to the horizontal polarization element 235, the elliptical polarization element 240, and the vertical polarization 245. More particularly, although not shown in FIG. 2, in some embodiments, an antenna assembly can include, for example, a module and/or the like that can copy and/or split the processed electrical signal into a first processed electrical signal associated with the horizontal polarization, a second processed electrical signal associated with the vertical polarization, and a third processed electrical signal associated with the vertical polarization. In other embodiments, the processing module (not shown in FIG. 2) can be configured to copy and/or form three processed electrical signals that are associated with the horizontal polarization, the elliptical polarization, or the vertical polarization. In this manner, the antenna assembly 230 can send a set of electromagnetic signals having three polarized streams to an electronic device (e.g., the electronic device 260) over the network 250, as described in detail above.

Although the signal associated with the horizontal polarization is described above as having a greater signal strength than the signal associated with the elliptical polarization, in some instances, the phase delay module 220 can receive a set of signals (e.g., electrical signals) associated with the horizontal polarization, the elliptical polarization, and the vertical polarization with different signal strengths than described above. For example, in some instances, the phase delay module 220 can determine a signal associated with the elliptical polarization has a higher signal strength than the strength of the signal associated with the horizontal polarization and can also determine a signal associated with the vertical polarization has a lower signal strength than the strength of the signal associated with the horizontal polarization. In such instances, the phase delay module 220 can produce a combined signal that can include the signal associated with the elliptical polarization, a first phase-delayed signal associated with the horizontal polarization, and a second phase-delayed signal (with a second phase-delay that is different than the first phase-delay) associated with the vertical polarization.

In other instances, the phase delay module 220 can determine a signal associated with the vertical polarization has a higher signal strength than the strength of the signal associated with the horizontal polarization and the signal associated with the elliptical polarization, and can also determine that the signal associated with the horizontal polarization and the signal associated with the elliptical polarization have substantially similar signal strengths. In such instances, the phase delay module 220 can produce a combined signal that can include the signal associated with the vertical polarization, a phase-delayed signal associated with the horizontal polarization, and a phased-delayed signal associated with the elliptical polarization (with substantially the same phase-delay as the phase-delay associated with the horizontal polarization). In this manner, the phase delay module 220 can be configured to delay and/or modify any of the signals associated with any of the polarizations in any suitable manner such as to produce a combined signal having, for example, an increased signal strength, and increased signal-to-noise ratio, an increased gain, an increased attenuation, a decreased signal fade, and/or the like.

Although the phase delay module 220 is described above as receiving electrical signals and, upon receipt, combining the electrical signals to define a combined signal having greater strength, signal-to-noise ratio, gain, attenuation, and/or the like, in other embodiments, the phase delay module 220 need not combine the electrical signals to improve signal quality (e.g., strength, integrity, etc.). For example, in some instances, the horizontal polarization element 235 can receive a first electromagnetic signal having the horizontal polarization, the elliptical polarization element 240 can receive a second electromagnetic signal having the elliptical polarization, and the vertical polarization element 245 can receive a third electromagnetic signal having the vertical polarization. In some instances, the first electromagnetic signal can be associated with, for example, a first data stream and the second electromagnetic signal can be associated with, for example, a second data stream, different from the first data stream and the third electromagnetic signal can be associated with, for example, a third data stream. In such instances, the arrangement of the horizontal polarization element 235, the elliptical polarization element 240, and the vertical polarization element 245 can increase and/or otherwise optimize spatial diversity, which can allow for an increase in throughput or the like. Moreover, the increase and/or optimization of the spatial diversity through the use of the three polarizations (e.g., horizontal, elliptical, and vertical) can be such that the antenna assembly 230 can differentiate the data streams more effectively than otherwise possible using, for example, two polarizations. Thus, the phase delay module 220 and/or any other suitable portion of the processor 215 can receive a first electrical signal associated with the first electromagnetic signal and a second electrical signal associated with the second electromagnetic signal and a third electrical signal associated with the third electromagnetic signal and, upon receipt, can process the electrical signals as described above.

Figure 3:
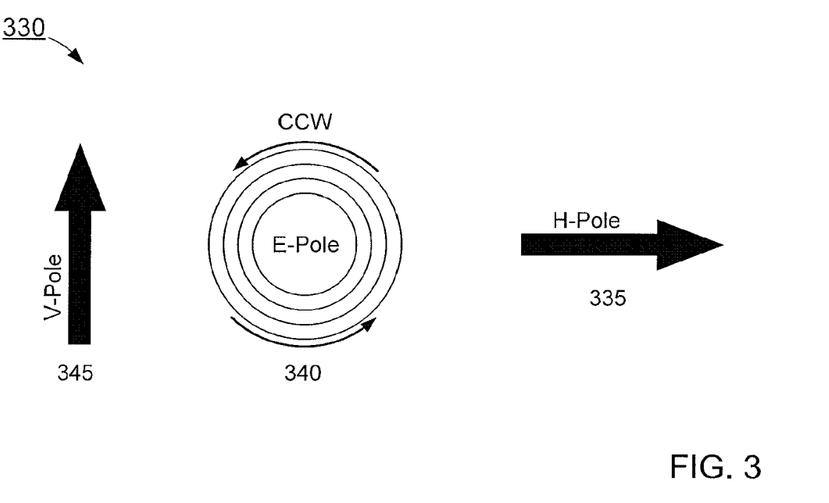
FIG. 3 is a schematic representation of an antenna assembly, according to an embodiment.

FIG. 3 is a schematic representation of an antenna assembly 330, according to an embodiment. The antenna assembly 330 can be included in any suitable electronic device such as, for example, the electronic device 200 described above with reference to FIG. 2. For example, the antenna assembly 330 can be included in a communication device or module such as a network interface card (e.g., a wireless card) to enable the electronic device to communicate with a network (e.g., the network 250 in FIG. 2).

The antenna assembly 330 includes a vertical polarization element 345, an elliptical polarization element 340, and a horizontal polarization element 335. Although not shown in FIG. 3, the antenna assembly 330 can include any suitable hardware, housing, and/or electronic circuit that can facilitate the operation of the antenna assembly 330. For example, in some embodiments, the vertical polarization element 345, the elliptical polarization element 340, and the horizontal polarization element 335 can be operably coupled to a printed circuit board or the like that can include at least a processor and/or a memory (not shown). In some instances, the processor can include, for example, a phase delay module such as the phase delay module 120 of FIG. 1 and/or the phase delay module 220 of FIG. 2. As such, the vertical polarization element 345, the elliptical polarization element 340, and the horizontal polarization element 335 can each send an electrical signal to and/or receive an electrical signal from the phase delay module, as described in detail above with reference to FIG. 2.

As shown in FIG. 3, the vertical polarization element 345 and the horizontal polarization element 335 are arranged in a substantially orthogonal orientation relative to one another. In some instances, the horizontal polarization and the vertical polarization can be a linear polarization (as described above). Conversely, the elliptical polarization element 340 can be a nonlinear polarization (e.g., an elliptical polarization or a circular polarization). The elliptical polarization element 340 can have, for example, a counterclockwise orientation. As a result, the elliptical polarization element can effectively couple to the electrical field of a received electromagnetic wave associated with the elliptical polarization that rotates about an axis in a substantially corkscrew manner (e.g., an electric field vector extends in a substantially helical manner). Although the elliptical polarization element 340 is shown in FIG. 3 as having a counterclockwise orientation, in other embodiments, an antenna assembly can include an elliptical polarization element with a clockwise orientation.

Although described above and shown in FIG. 3 in a particular arrangement, the antenna assembly 330 can be arranged in any suitable manner. For example, while the elliptical polarization element 340 is shown in FIG. 3 as being disposed between the vertical polarization element 345 and the horizontal polarization element 335, in other arrangements, an antenna assembly can include a vertical polarization element that is adjacent to a horizontal polarization element and can further include an elliptical polarization element that is adjacent to either the horizontal polarization element or the vertical polarization element. While the antenna assembly 330 of FIG. 3 shows the polarization elements 335, 340, and 345 arranged linearly, in other embodiments, an antenna assembly can include a vertical polarization element, an elliptical polarization element and a horizontal polarization element arranged in a nonlinear manner. Moreover, although the antenna assembly 330 of FIG. 3 includes one vertical polarization element 345, one elliptical polarization element 340, and one horizontal polarization element 335, in other embodiments, an antenna assembly can include any number of vertical polarization elements, elliptical polarization elements, and/or horizontal polarization elements.

Figure 4:
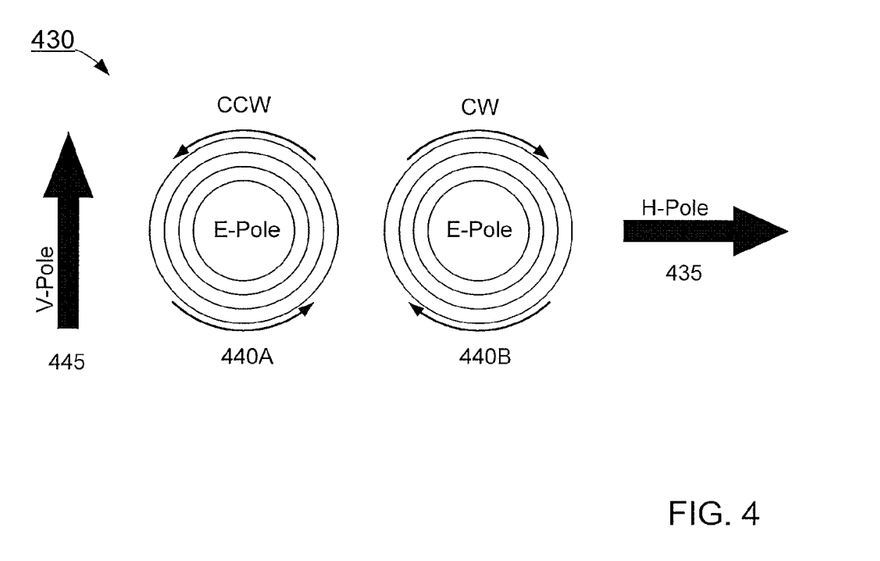
FIG. 4 is a schematic representation of an antenna assembly, according to another embodiment.

Although the antenna assembly 330 of FIG. 3 is described as having a polarization diversity of three polarizations (e.g., vertical, elliptical, and horizontal), in other embodiments, an antenna assembly can have a polarization diversity of more than three polarizations. For example, FIG. 4 is a schematic representation of an antenna assembly 430, according to another embodiment. As described above, the antenna assembly 430 can be included in any suitable electronic device (e.g., any of those described herein) and can be configured to enable the electronic device to communicate with a network (e.g., the network 150 and/or the network 250).

The antenna assembly 430 includes a vertical polarization element 445, a first elliptical polarization element 440A, a second elliptical polarization element 440B, and a horizontal polarization element 435. The vertical polarization element 445 and the horizontal element 435 can be substantially similar in form, function, and orientation as the vertical polarization element 345 and the horizontal polarization element 335, respectively, described above with reference to FIG. 3. As shown in FIG. 3, the first elliptical polarization element 440A can be a nonlinear polarization and can have, for example, a counterclockwise orientation. Similarly, the second elliptical polarization element 440B can be a nonlinear polarization and can have, for example, a clockwise orientation. Thus, the antenna assembly 430 can send and/or receive an electromagnetic signal having a polarization diversity of four polarizations. Moreover, as described above with reference to the electronic device 110 of FIG. 1 and the electronic device 210 of FIG. 2, the antenna assembly 430 can be operably coupled to a processor or the like (not shown in FIG. 4) that can include a phase delay module. As such, the antenna assembly 430 can send a set of electrical signals, representing a set of received electromagnetic signals, to the phase delay module, and based at least partially on the signal strength of each electrical signal, the phase delay module can delay and/or otherwise modify the phase of an electrical signal associated with a particular polarization, as described in detail above. Thus, phase delay module can produce a combined electrical signal having one or more nonphase-delayed signals and one or more phase-delayed signals (each with a similar phase-delay or with different phase-delays), as described in detail above.

Figure 5:
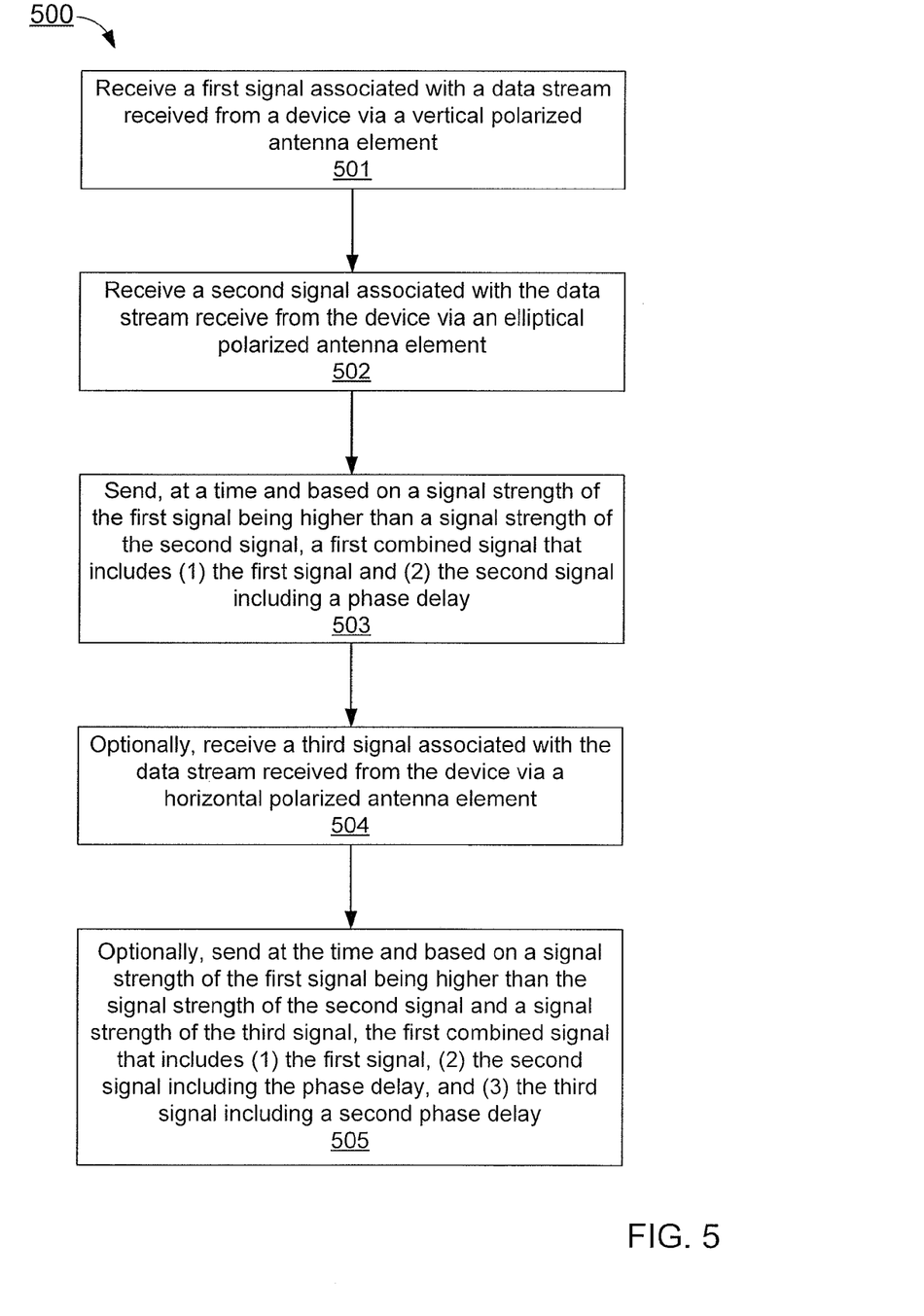
FIG. 5 is a flowchart illustrating a method of using a tri-polarization antenna system, according to an embodiment.

FIG. 5 is a flowchart illustrating a method 500 of using a multi-polarization antenna system, according to an embodiment. The method 500 includes receiving a first signal associated with a data stream from a device via a vertical polarized antenna element, at 501. A second signal associated with the data stream is received from the device via an elliptical polarized antenna element, at 502. The vertical polarized element and the elliptical polarized element can each be included in an antenna assembly (e.g., the antenna assembly 130, 230, 330, and/or 430) of an electronic device such as the electronic device 110 of FIG. 1 and/or the electronic device 210 of FIG. 2.

At a time and based on a signal strength of the first signal being higher than a signal strength of the second signal, a first combined signal is sent that includes (1) the first signal and (2) the second signal including a phase delay, at 503. For example, in some embodiments, the vertical polarized antenna element and the elliptical polarized antenna element can be operably coupled to a processor or the like that can include a phase delay module (e.g., the phase delay module 120 of FIG. 1 and/or the phase delay module 220 of FIG. 2). In such embodiments, the phase delay module can determine the signal strength of the first signal and the signal strength of second signal and, based on the signal strengths, can produce the first combined signal.

In some instances, a third signal associated with the data stream is optionally received from the device via a horizontal polarized antenna element, at 504. The horizontal polarized antenna element can be included in the antenna assembly and can be arranged in any suitable manner relative to the vertical polarized antenna element and the elliptical polarized antenna element. At the time and based on the signal strength of the first signal being higher than the signal strength of the second signal and the signal strength of the third signal, the first combined signal is optionally sent that includes (1) the first signal, (2) the second signal include the phase delay, and (3) the third signal including a second phase delay, at 505. In this manner, the antenna assembly including the vertical polarized antenna element, the elliptical polarized antenna element, and the horizontal polarized antenna element can receive and/or can send a set of signals having a polarization diversity with three polarized data streams.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although the embodiments and methods described herein include a phase delay module that receives a set of electrical signals associated with a corresponding set of electromagnetic signals and, upon receipt, defines a combined signal, in other embodiments, a phase delay module can receive a set of electrical signals associated with a corresponding set of electromagnetic signals and can employ any suitable phase delay techniques without defining a combined signal. For example, in some instances, each electrical signal received by a phase delay module can be associated with a different data stream. In such instances, the phase delay module can apply any suitable phase delay to any of the electrical signals (as described above) and can send the electrical signals and/or phase delayed signals to, for example, a processor or the like to be processed.

In some instances, any of the embodiments described herein can be used to define a combined signal having greater signal strength and/or the like as well as increasing and/or optimizing spatial diversity of electromagnetic signals. For example, in some instances, a first electronic device such as the electronic device 210 can include an antenna assembly such as the antenna assembly 230 with three polarization elements and can be in communication with a second electronic device (e.g., the electronic device 110), via a network (e.g., the network 150), having an antenna assembly (e.g., the antenna assembly 130) including two polarization elements. In such instances, the electronic devices can be in communication via the network such that channel state information (CSI) is known. For example, the second electronic device knows that the first electronic device includes the antenna assembly with three polarization elements (and vice versa). As such, in some instances, the second electronic device can send a data stream including, for example, a first and a second electromagnetic signal associated with a first and a second portion, respectively, of the data stream and a third signal that is the same as, for example, the first electromagnetic signal (e.g., the first and the third electromagnetic signals are associated with the same portion of data). In this manner, the three polarization elements of the first electronic device can receive the electromagnetic signals having the polarization diversity and can be configured to combine the electromagnetic signals (or electrical signals representing the electromagnetic signals) associated with the same portion of the data stream (e.g., using MRC or the like) to define a combined signal having a greater strength, attenuation, signal-noise-ratio, etc. In some instances, a phase delay module included in the first electronic device can apply any suitable phase delay to either the first or the third electromagnetic signal (or an electric signal representing the electromagnetic signal) prior to defining the combined signal (as described above). Thus, a processor or the like included in the first electronic device can process, for example, the combined signal associated with the first portion of the data stream and the second signal associated with the second portion of the data stream.

In other instances, the first electronic device can send a data stream including, for example, a first, second, and third electromagnetic signal to the second electromagnetic signal. With the first electronic device being in communication with the second electronic device such that the CSI is known, the first electronic device can send the data stream such that two of the electromagnetic signals are associated with the same portion of data and the other electromagnetic signal is associated with a difference portion of the data. Thus, the second electronic device can receive, combine, phase delay, and/or process the electromagnetic signals as described above.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain of the events may be performed concurrently in a parallel process when possible, as well as performed sequentially as described above.

What is claimed:

1. An apparatus, comprising:
a phase delay module configured to receive a plurality of signals from an antenna assembly including a horizontal polarization element and an elliptical polarization element that are collectively configured to receive the plurality of signals over a coverage area,
the phase delay module configured to determine (1) a signal strength of a first signal from the plurality of signals that was received via the horizontal polarization element and (2) a signal strength of a second signal from the plurality of signals that was received via the elliptical polarization element,
if the signal strength of the first signal is higher than the signal strength of the second signal, the phase delay module configured to send a combined signal including (1) the first signal and (2) the second signal having a phase delay.

2. The apparatus of claim 1, wherein the elliptical polarization element is a circular polarization element.

3. The apparatus of claim 1, wherein the horizontal polarization element is configured to receive signals over a first portion of the coverage area and the elliptical polarization element is configured to receive signals over a second portion of the coverage area different from the first portion.

4. The apparatus of claim 1, wherein:
the combined signal is a first combined signal, the phase delay is a first phase delay, the antenna assembly includes a vertical polarization element,
the phase delay module is configured to determine a signal strength of a third signal from the plurality of signals received via the vertical polarization element,
if the signal strength of the first signal is higher than the signal strength of the second signal and the signal strength of the third signal, the phase delay module is configured to send a combined signal including (1) the first signal, (2) the second signal including the first phase delay, and (3) the third signal including a second phase delay different from the first phase delay.

5. The apparatus of claim 1, wherein the phase delay is a first phase delay, if the signal strength of the second signal is higher than the signal strength of the first signal, the phase delay module is configured to send a combined signal including (1) the second signal and (2) the first signal including a second phase delay.

6. The apparatus of claim 1, wherein the elliptical polarization element is a clockwise polarization element.

7. The apparatus of claim 1, wherein the elliptical polarization element includes a corkscrew shaped element.

8. A method, comprising:
receiving a first signal associated with a data stream received from a device via a vertical polarized antenna element;
receiving a second signal associated with the data stream received from the device via an elliptical polarized antenna element;
sending, at a time and based on a signal strength of the first signal being higher than a signal strength of the second signal, a first combined signal that includes (1) the first signal and (2) the second signal including a phase delay.

9. The method of claim 8, wherein the combined signal is a first combined signal, the phase delay is a first phase delay, and the time is a first time, the method further comprising:
receiving, after the first time, a third signal associated with the data stream received from the device via the vertical polarized antenna element;
receiving, after the first time, a fourth signal associated with the data stream received from the device via the elliptical polarized antenna element;
defining, at a second time after the first time and based on a signal strength of the fourth signal being higher than a signal strength of the third signal, a second combined signal that includes (1) the fourth signal and (2) the third signal including a second phase delay.

10. The method of claim 8, wherein the phase delay is a first phase delay, the method further comprising:
receiving a third signal associated with the data stream received from the device via a horizontal polarized antenna element;
sending, at the time and based on a signal strength of the first signal being higher than the signal strength of the second signal and a signal strength of the third signal, the first combined signal that includes (1) the first signal, (2) the second signal including the first phase delay, and (3) the third signal including a second phase delay.

11. The method of claim 10, wherein the first phase delay is different than the second phase delay.

12. The method of claim 8, wherein the elliptical polarization element is a circular polarization element.

13. The method of claim 8, wherein the elliptical polarization element is a counter clockwise polarization element.

14. The method of claim 8, wherein the elliptical polarization element is a corkscrew polarization element.

15. An apparatus, comprising:
an antenna assembly configured to be operatively coupled to a phase delay module and configured to receive a plurality of signals from a device,
the antenna assembly including a horizontal polarization element, a vertical polarization element, and an elliptical polarization element,
the antenna assembly configured to receive (1) a first signal from the plurality of signals via the horizontal polarization element, (2) a second signal from the plurality of signals via the vertical polarization element, and (3) a third signal from the plurality of signals via the elliptical polarization element,
the antenna assembly configured to pass the first signal, the second signal, and the third signal to the phase delay module such that the phase delay module sends, when a signal strength of the first signal is greater than a signal strength of the second signal and a signal strength of the third signal, a combined signal that includes (1) the first signal, (2) the second signal including a first phase delay, and (3) the third signal including a second phase delay.

16. The apparatus of claim 15, wherein the antenna assembly is configured to pass the first signal, the second signal, and the third signal to the phase delay module such that the phase delay module sends, when the signal strength of the second signal is greater than the signal strength of the first signal and the signal strength of the third signal, the combined signal that includes (1) the second signal, (2) the first signal including a third phase delay, and (3) the third signal including a fourth phase delay.

17. The apparatus of claim 15, wherein the horizontal polarization element is configured to receive signals over a first portion of the coverage area and the elliptical polarization element is configured to receive signals over a second portion of the coverage area different from the first portion.

18. The apparatus of claim 15, wherein the horizontal polarization element is spaced apart from both the vertical polarization element and the elliptical polarization element by at least about one-quarter of a wavelength.

19. The apparatus of claim 15, wherein the elliptical polarization element is a circular polarization element.

20. The apparatus of claim 15, wherein the elliptical polarization element is a counter clockwise polarization element.

* * * * *